United States Patent
Jeong et al.

(10) Patent No.: US 12,155,296 B2
(45) Date of Patent: Nov. 26, 2024

(54) CURRENT COMPENSATION SYSTEM FOR PHOTOVOLTAIC GENERATOR, QUALITY MEASUREMENT DEVICE, MEASUREMENT METHOD THEREOF, AND RECORDING MEDIUM THEREOF

(71) Applicants: EM CORETECH INC., Ulsan (KR); UNIST (ULSAN NATIONAL INSTITUTE OF SCIENCE AND TECHNOLOGY), Ulsan (KR)

(72) Inventors: Sang Yeong Jeong, Ulsan (KR); Jin Gook Kim, Ulsan (KR)

(73) Assignees: EM CORETECH INC. (KR); UNIST (ULSAN NATIONAL INSTITUTE OF SCIENCE AND TECHNOLOGY) (KR)

( * ) Notice: Subject to any disclaimer, the term of this patent is extended or adjusted under 35 U.S.C. 154(b) by 204 days.

(21) Appl. No.: 17/766,811

(22) PCT Filed: Oct. 7, 2020

(86) PCT No.: PCT/KR2020/013652
§ 371 (c)(1),
(2) Date: May 23, 2022

(87) PCT Pub. No.: WO2021/071241
PCT Pub. Date: Apr. 15, 2021

(65) Prior Publication Data
US 2023/0344336 A1    Oct. 26, 2023

(30) Foreign Application Priority Data

Oct. 7, 2019   (KR) .................. 10-2019-0123971
Oct. 7, 2019   (KR) .................. 10-2019-0123972

(51) Int. Cl.
*H02M 1/44*     (2007.01)
*H02S 40/32*    (2014.01)

(52) U.S. Cl.
CPC .............. *H02M 1/44* (2013.01); *H02S 40/32* (2014.12)

(58) Field of Classification Search
CPC ....... H02M 1/44; H02M 1/0009; H02M 1/123
See application file for complete search history.

(56) References Cited

U.S. PATENT DOCUMENTS

2009/0102491 A1   4/2009  Bessho
2013/0062958 A1   3/2013  Erickson, Jr. et al.
(Continued)

FOREIGN PATENT DOCUMENTS

EP    3232552 A1    10/2017
JP    2000329808 A  11/2000
(Continued)

OTHER PUBLICATIONS

Dongil Shin et al., "A Common-Mode Active Filter in a Compact Package for a Switching Mode Power Supply", IEEE, 2014, pp. 340-345.
(Continued)

*Primary Examiner* — Jue Zhang
*Assistant Examiner* — Afework S Demisse
(74) *Attorney, Agent, or Firm* — NKL Law; Jae Youn Kim

(57) ABSTRACT

Provided is a current compensation system for solar generators for compensating for noise using an active electromagnetic interference (EMI) filter. An inverting system for solar generators includes a solar inverter converting DC voltage to AC voltage, an EMI filter unit including an active EMI filter to reduce noise corresponding to the AC voltage, a power grid, and at least two or more through lines passing
(Continued)

a second current from the power grid to the solar inverter and passing through the EMI filter unit, wherein the active EMI filter includes a noise sensing unit sensing a first current on the at least two or more through lines and generating an output signal corresponding to the first current, an active circuit unit amplifying the output signal to generate an amplified signal, a compensation unit generating a compensation current based on the amplified signal, and a transmission unit providing a path through which the compensation current flows to each of the at least two large current paths.

12 Claims, 15 Drawing Sheets

(56) References Cited

U.S. PATENT DOCUMENTS

| | | | | |
|---|---|---|---|---|
| 2015/0340868 | A1* | 11/2015 | Chapman | H02J 3/381 307/82 |
| 2018/0062538 | A1 | 3/2018 | Tannhaeuser | |

FOREIGN PATENT DOCUMENTS

| | | | |
|---|---|---|---|
| JP | 2005117467 A | 4/2005 | |
| JP | 2016063478 A | 4/2016 | |
| KR | 20010108174 A | 12/2001 | |
| KR | 10-2005-0013647 A | 2/2005 | |
| KR | 10-2010-0017730 A | 2/2010 | |
| KR | 10-2012-0053606 A | 5/2012 | |
| KR | 10-1945463 B1 | 2/2019 | |
| WO | 2013/008925 A1 | 1/2013 | |
| WO | WO-2022139083 A1 * | 6/2022 | ............ G01R 19/10 |

OTHER PUBLICATIONS

Office Action issued by Korean Intellectual Property Office, Sep. 11, 2024.

* cited by examiner

US 12,155,296 B2

CURRENT COMPENSATION SYSTEM FOR PHOTOVOLTAIC GENERATOR, QUALITY MEASUREMENT DEVICE, MEASUREMENT METHOD THEREOF, AND RECORDING MEDIUM THEREOF

TECHNICAL FIELD

The present disclosure relates to a current compensation system for solar generators for compensating for noise using an active EMI filter.

The present disclosure relates to a device quality inspection apparatus. In particular, the present disclosure relates to an apparatus for measuring parameters for automatically checking quality of a device including a multi-port or multi-terminal, a measuring method and a recording medium.

BACKGROUND ART

In general, electrical devices such as household electrical appliances, industrial electrical appliances and electric vehicles emit noise during operation. For example, noise may be generated due to a switching operation inside the electrical device. Such noise is not only harmful to the human body, but also causes malfunction of other connected electronic devices.

Electromagnetic interference that an electronic device exerts on other devices is called electromagnetic interference (EMI), and among them, noise transmitted through wires and wiring of a substrate is called conducted emission (CE) noise.

EMI noise emission is strictly regulated in all electronic products to ensure that electronic devices operate without causing malfunctions in peripheral components and other devices. Therefore, most electronic products essentially include an electromagnetic wave noise reduction device such as an EMI filter that reduces EMI noise in order to satisfy the regulation on the noise emission.

For example, in white home appliances such as air conditioners, electric vehicles, aviation, and energy storage systems (ESSs), a current compensation device is essentially included. A conventional current compensation device uses a common mode choke (CM choke) to reduce common mode (CM) noise among conducted emission (CE) noise.

However, in the case of common mode (CM) chokes, noise reduction performance drops sharply due to magnetic saturation in high power/high current systems, and if the size or number of the common mode chokes is increased to maintain noise reduction performance, the size and price of the EMI filter are greatly increased.

In particular, an EMI filter for solar generators includes a first EMI filter for reducing conducted noise and a second EMI filter for including a device for protecting a surge. In other words, if a common mode choke (CM choke) is included in each of the two EMI filters, the volume and area of the entire setup for solar generators increases.

In order to analyze characteristics of frequency devices such as RF devices, a device quality inspection apparatus is often used. The device quality inspection apparatus obtains various test parameters of a device under test (DUT), namely a transfer function, a reflection characteristic, and a phase characteristic (hereinafter 'scattering parameter S' or 'S parameter'). The S parameter is a well-known technique in the art, and is determined by observing the frequency response (voltage and phase) of the device under test according to the response of the test signal from the device quality inspection apparatus.

On the other hand, the DUT or device to be measured, which is the target of S parameter measurement, may be formed to include three or more terminals as well as two terminals (ports). In order to measure the S parameter of this device to be measured, considerable time and labor are consumed to connect and disconnect a screw connection type SMA port, and a cable damage rate increases according to the connection and disconnection.

In particular, as the number of terminals increases, for example, in the case of a device to be measured having more than 8 terminals, such as three-phases and four-wires, the number of times to change the connection between a port and a terminal rapidly increases. For example, in the case of a device to be measured with N terminals, disconnection and connection must be performed $_NC_2$ times.

DESCRIPTION OF EMBODIMENTS

Technical Problem

An objective of the present disclosure is to provide an inverting system for solar generators which uses an active EMI filter to reduce overall volume and area while maintaining noise removal performance.

An objective of the present disclosure is to provide a measuring device, a measuring method, and a recording medium for measuring quality of a multi-channel device to be measured by only one connection with a port.

In addition, an objective of the present disclosure is to provide a method for automatically measuring quality of a device to be measured after a port is connected.

However, these tasks are exemplary, and the scope of the present disclosure is not limited thereby.

Technical Solution to Problem

An inverting system for solar generators according to an embodiment of the present disclosure may include a solar inverter converting DC voltage to AC voltage, an EMI filter unit including an active EMI filter to reduce noise corresponding to the AC voltage, a power grid, and at least two or more through lines passing a second current from the power grid to the solar inverter and passing through the EMI filter unit, wherein the active EMI filter may include a noise sensing unit sensing the first current on the at least two or more through lines and generating an output signal corresponding to the first current, an active circuit unit amplifying the output signal to generate an amplified signal, a compensation unit generating a compensation current based on the amplified signal, and a transmission unit providing a path through which the compensation current flows to each of the at least two large current paths.

In addition, the EMI filter unit may include a first AC EMI filter and a second AC EMI filter, and at least one of the first AC EMI filter and the second AC EMI filter may include the active EMI filter.

In addition, the solar inverter may include a DC EMI filter, and the DC EMI filter may include the active EMI filter.

In addition, a Y-capacitor for decoupling connected in parallel to a power line of a power supply side may be further provided so that the active EMI filter may operate regardless of a structure of the power supply side that is an output unit of the active EMI filter.

A parameter measuring device for testing a device to be measured including a plurality of terminals according to an embodiment of the present disclosure may include a port including a first port and a second port, a plurality of switches each configured to be selectively connected to the first port and the second port, and a processor selecting two switches among the plurality of switches, controlling the plurality of switches to alternately connect each of the two switches to the first port and the second port, controlling the first port to input a test signal to the device to be measured through either one of the two switches, and measuring a S parameter based on a reflected signal and a response signal obtained through the port.

In addition, the processor may control the second port to input the test signal to the device to be measured through any one of the two switches, and may measure the S parameter based on the reflected signal and the response signal obtained through the port.

In addition, the number of the plurality of switches may be the same as the number of terminals of the device to be measured.

In addition, each of the plurality of switches may be a single pole triple throw (SPTT), each of the plurality of switches may be selectively connected to the first port, the second port and an internal resistor that includes a normalized impedance, and the processor may control the plurality of switches such that switches other than two switches among the plurality of switches are connected to the internal resistor.

Meanwhile, a measuring method of the parameter measuring device for testing the device to be measured including the plurality of terminals may include selecting two switches among the plurality of switches by the processor, alternately connecting each of the two switches to the first port and the second port of the port by the processor, inputting the test signal to the device to be measured through one of the two switches by the processor, and measuring the S parameter based on the reflected signal and the response signal acquired through the port by the processor.

On the other hand, a recording medium according to an embodiment of the present disclosure may be a computer-readable recording medium in which a program for executing the parameter measuring method is recorded.

Other aspects, features, and advantages other than those described above will become apparent from the detailed description, claims and drawings for carrying out the following disclosure.

Advantageous Effects of Disclosure

According to an embodiment of the present disclosure made as described above, an inverting system for solar generators in which price, area, volume, and weight do not significantly increase through an active EMI filter may be provided. Specifically, the active EMI filter according to various embodiments may be reduced in price, area, volume, and weight compared to a passive filter including a CM choke.

In addition, the active EMI filter according to various embodiments of the present disclosure may provide an active EMI filter capable of independently operating without parasitics on the CM choke.

In addition, the inverting system for solar generators according to various embodiments of the present disclosure may have an active circuit stage electrically insulated from a power line through the active EMI filter, thereby stably protecting elements included in the active circuit stage.

In addition, the inverting system for solar generators according to various embodiments of the present disclosure may be protected from external overvoltage through the active EMI filter.

Through this, the present disclosure may provide an active EMI filter module which may operate stably regardless of characteristics of a surrounding electrical system, may have versatility as an independent part, and may be commercialized as a standalone module.

According to an embodiment of the present disclosure made as described above, a parameter measuring device may automatically measure S parameters sequentially after connecting a port to a device to be measured through a switch unit.

Accordingly, time may be saved and damage to the cable may be suppressed as it is not necessary to change a connection between the port of the parameter measuring device and a DUT port (or DUT terminal) several times.

Of course, the scope of the present disclosure is not limited by these effects.

MODE OF DISCLOSURE

Figure 1:
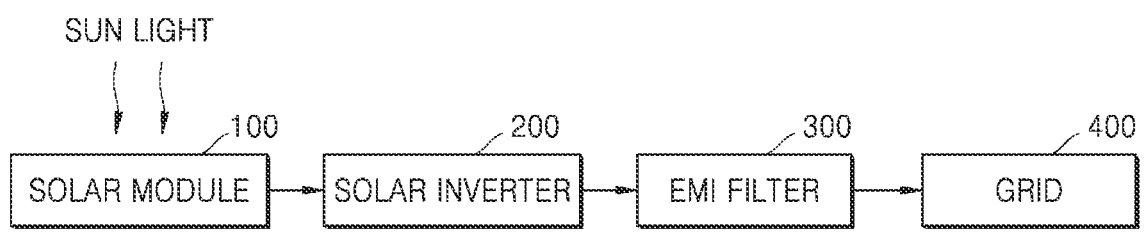
FIG. 1 is a view illustrating an inverting system for solar generators according to an embodiment of the present disclosure.

The present disclosure relates to a current compensation system for solar generators for compensating for noise using an active EMI filter. An inverting system for solar generators includes a solar inverter converting DC voltage to AC voltage, an EMI filter unit including an active EMI filter to reduce noise corresponding to the AC voltage, a power grid, and at least two or more through lines passing a second current from the power grid to the solar inverter and passing through the EMI filter unit, wherein the active EMI filter includes a noise sensing unit sensing a first current on the at least two or more through lines and generating an output signal corresponding to the first current, an active circuit unit amplifying the output signal to generate an amplified signal, a compensation unit generating a compensation current based on the amplified signal, and a transmission unit providing a path through which the compensation current flows to each of the at least two large current paths.

Mode for Disclosure

Hereinafter, various embodiments of the present disclosure are described in connection with the accompanying drawings. Various embodiments of the present disclosure may be subject to various modifications and may have various embodiments, and specific embodiments are illustrated in the drawings and the related detailed description is described. However, this is not intended to limit the various embodiments of the present disclosure to specific embodiments, and should be understood to include all modifications and/or equivalents or substitutes included in the spirit and scope of the various embodiments of the present disclosure. In connection with the description of the drawings, like reference numerals have been used for like components.

In various embodiments of the present disclosure, terms such as "comprise" or "have" are only intended to designate that the features, numbers, steps, operations, components, parts, or combinations thereof described in the specification exist, but does not preclude the possibility of the presence or addition of one or more other features or numbers, steps, operations, components, parts, or combinations thereof.

In various embodiments of the present disclosure, expressions such as "or" include any and all combinations of the words listed together. For example, "A or B" may include A, may include B, or may include both A and B.

Expressions such as "first", "second", "first", or "second" used in various embodiments of the present disclosure may modify various components of various embodiments, but do not limit the components. For example, the above expressions do not limit the order and/or importance of corresponding components, and may be used to distinguish one component from another.

When an element is referred to as being "connected" to another element, the element may be directly connected to or connected to the other element, but may be associated with the element. It should be understood that other new components may exist between the other components.

In an embodiment of the present disclosure, terms such as "module", "unit", "part", etc. are terms for designating a component that performs at least one function or operation, and these components are hardware or software. It may be implemented or implemented as a combination of hardware and software. In addition, a plurality of "modules", "units", "parts", etc. may be integrated into at least one module or chip and implemented with at least one processor, except when each needs to be implemented with individual specific hardware.

Terms such as those defined in a commonly used dictionary should be interpreted as having a meaning consistent with the meaning in the context of the related art, and unless clearly defined in various embodiments of the present disclosure, the terms are ideal or excessively not to be interpreted in a formal sense.

Hereinafter, various embodiments of the present disclosure will be described in detail with reference to the accompanying drawings.

FIG. 1 is a view illustrating an inverting system for solar generators according to an embodiment of the present disclosure.

An inverting system 10 for solar generators includes a solar module 100, a solar inverter 200, an EMI filter 300 and a grid 400.

The solar module 100 is a configuration for converting solar heat into voltage using a photoelectric effect, and may include a photovoltaic (PV) panel and a PV cell. The solar module 100 may apply a DC voltage generated through solar power generation to an inverter for a solar generator or a DC input side of the solar inverter 200.

The voltage generated by the solar module 100 is the DC voltage, and most power grids are AC voltages (e.g., 60 hz). Accordingly, a DC-to-AC (DAC) inverter is needed to change the same. Thus, the solar inverter 200 may convert the DC voltage received from the solar module 100 into the AC voltage. This will be described in detail with reference to FIG. 2.

Meanwhile, the inverting system 10 for solar generators may include the EMI filter 300 to reduce conducted emission (CE) noise with respect to the AC voltage converted by the solar inverter 200. The EMI filter 300 according to an embodiment of the present disclosure may be implemented as an active EMI filter capable of independently operating without parasitism in a CM choke.

The active EMI filter 200 may be a filter mounted on a PCB of a passive filter unit instead of one CM choke and four Y-caps. This will be described in detail with reference to FIG. 3.

The AC voltage with reduced noise by the EMI filter 300 may be transmitted to the grid 400. In this case, the grid 400 may be a power grid using a voltage generated through solar power generation, and is not limited to a specific device.

Figure 2:
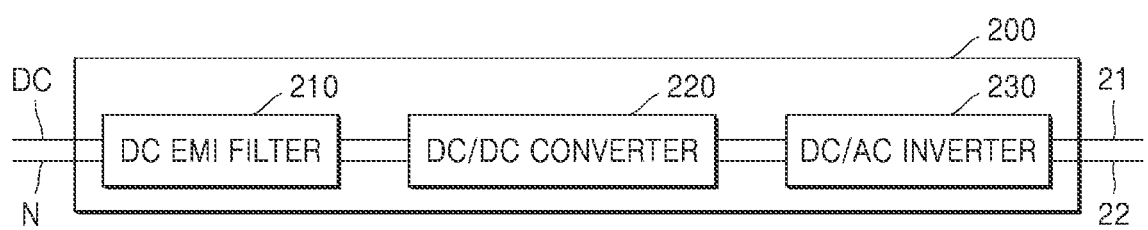
FIG. 2 is a view for explaining a solar inverter according to an embodiment of the present disclosure.

FIG. 2 is a view for explaining a solar inverter according to an embodiment of the present disclosure.

Referring to FIG. 2, the solar inverter 200 according to an embodiment of the present disclosure may include a DC EMI filter 210, a DC/DC converter 220, and a DC/AC inverter 230.

A cable is placed between the solar module 100 and the solar inverter 200, and if there is a lot of noise in the cable, cable noise radiation may occur. Accordingly, the solar inverter 200 may include the DC EMI filter 210 for reducing noise radiation.

According to an embodiment of the present disclosure, the DC EMI filter 210 may be implemented as the active EMI filter. For example, in the case of a 150 khz~10 Mhz band target, since a main cause of the cable noise radiation is common mode (CM) noise, the active EMI filter may be applied to the DC EMI filter 210.

Meanwhile, since the incident amount of sunlight is not uniform throughout the year/day, the DC voltage generated by the solar module 100 is also not constant. Accordingly, the inverting system 10 for solar generators may include the DC/DC converter 220 to maintain a non-uniform DC power generation voltage as a constant DC voltage that the system may use.

Specifically, based on South Korea, in order to convert to 220 V/60 hz AC voltage, a DC voltage of about 300 V or more is required at the DC input of the DC-to-AC (DAC)

inverter. For example, when the voltage generated by the solar module 100 is less than 300 V voltage, the DC voltage may be boosted through the DC/DC converter 220. For example, the DC/DC converter 220 may be implemented as a non-isolated unidirectional boost converter, and through this, a constant voltage of 300 V or more may be supplied to an input of an AC-to-DC (AD) inverter.

As described above, the inverting system 10 for solar generators may include the DC/AC inverter 230 as a power conversion circuit for converting the DC voltage into the AC voltage. The DC/AC inverter 230 may convert the DC voltage to 220 V/60 hz and supply it to the AC power grid 400. For example, the DC/AC inverter 230 may be implemented as a T-type inverter circuit, and may include a reactor for sufficiently reducing harmonics in order to meet harmonic standards.

The AC voltage converted by the DC/AC inverter 230 may be transmitted to the EMI filter 300 through a first through line 21 and a second through line 22. Meanwhile, although FIG. 2 illustrates that the first through line 21 and the second through line 22 are implemented as one DC line and one N-phase line, respectively, this is only an example. When a plurality of solar panels 100 are installed in parallel, the inverting system 10 for solar generators may include a plurality of DC lines in response to solar current. According to an embodiment, the inverting system 10 for solar generators may include through lines having three-phases and four-wires with three power lines of R-phase, S-phase and T-phase, and a thick N-phase line, but the present disclosure is not limited thereto, and may include through lines having three-phases and three-wires.

Figure 3:
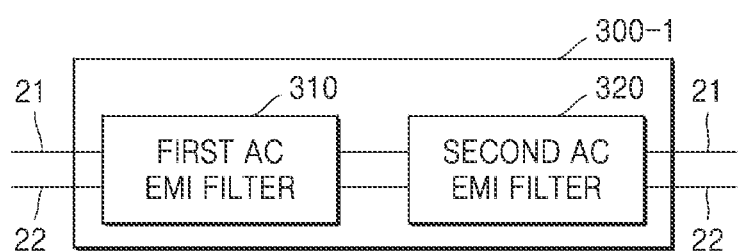
FIG. 3 is a view for explaining an EMI filter according to an embodiment of the present disclosure.

FIG. 3 is a view for explaining an EMI filter according to an embodiment of the present disclosure.

Referring to FIG. 3, the EMI filter 300 of the present disclosure may include a first AC EMI filter 310 and a second AC EMI filter 320. In this case, the first AC EMI filter 310 may be an EMI filter for reducing conducted noise. For example, the first AC EMI filter 310 may include a current sensor and a relay as well as a filter.

Furthermore, the second AC EMI filter 320 may also be an EMI filter for reducing conducted noise. The second AC EMI filter 320 according to an embodiment of the present disclosure may include a surge protection element.

The first AC EMI filter 310 and/or the second AC EMI filter 320 according to an embodiment of the present disclosure may be implemented through the active EMI filter instead of the CM choke. The conventional EMI filter for solar generators includes two filter parts because the size and volume are greatly increased by including a passive element. However, according to the present disclosure, the first AC EMI filter 310 and/or the second AC EMI filter 320 may be reduced in size and volume by using an active element, and thus the first AC EMI filter 310 and/or the second AC EMI filter 320 may be implemented with one EMI filter.

The active EMI filter of this disclosure that may be used in the inverting system 10 for solar generators will be described in detail with reference to FIGS. 4 to 6.

Figure 4:
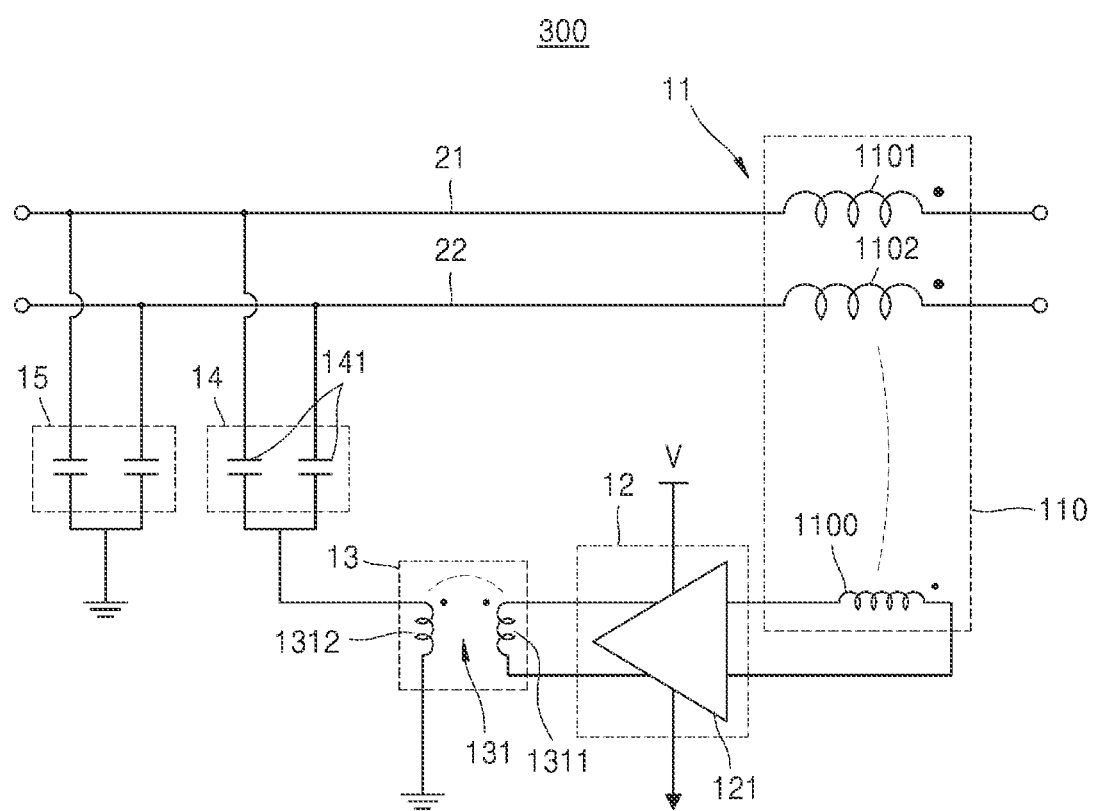
FIG. 4 illustrates a more specific example of an active EMI filter that may be used in an inverting system for solar generators according to an embodiment of the present disclosure.

FIG. 4 illustrates a more specific example of an active EMI filter that may be used in an inverting system for solar generators according to an embodiment of the present disclosure.

According to an embodiment, the power line transmitting power from the solar inverter 200 may be designed as the first through line 21 and the second through line 22 to pass through the active EMI filter.

As described above, the active EMI filter according to an embodiment may include a noise sensing unit 11, an active circuit unit 12, a compensation unit 13, and a transmission unit 14.

As described above, each of the two or more power lines or through lines 21 and 22 may be a path for transmitting power supplied by the grid 400, that is, a second current to the solar inverter 200.

According to an embodiment, the second current may be an alternating current having a frequency of a second frequency band. In this case, the second frequency band may be, for example, a band having a range of 50 Hz to 60 Hz.

In addition, each of the two or more power lines or through lines 21 and 22 may be a path through which at least a portion of the noise generated from the solar inverter 200, that is, a first current, is transmitted to the grid 400. At this time, the first current may be input to each of the two or more power lines or through lines 21 and 22 in a common mode.

The first current may be a current that is unintentionally generated in the solar inverter 200 due to various causes. For example, the first current may be a noise current generated by virtual capacitance between the solar inverter 200 and a surrounding environment.

The first current may be a current having a frequency of a first frequency band. In this case, the first frequency band may be a higher frequency band than the aforementioned second frequency band, and may be, for example, a band having a range of 150 KHz to 30 MHz.

The noise sensing unit 11 may be electrically connected to the through lines 21 and 22 to detect the first current and generate an output signal corresponding to a sensing result. In other words, the noise sensing unit 11 may mean a means for sensing the first current on the through lines 21 and 22. According to an embodiment, the noise sensing unit 11 may include a sensing transformer 110.

The sensing transformer 110 may include a first reference winding 1101 and a second reference winding 1102 electrically connected to the first through line 21 and the second through line 22 which are power lines, respectively, and a sensing winding 1100 formed on a core with the first and second reference windings 1101 and 1102.

The first reference winding 1101 and the second reference winding 1102 may be a primary winding connected to the power lines, and the sensing winding 1100 may be a secondary winding.

Each of the first reference winding 1101 and the second reference winding 1102 may be in a form of a winding wound around the core, but is not limited thereto, and at least one of the first reference winding 1101 and the second reference winding 1102 may passes through the core.

The sensing winding 1100 may have a structure wound at least once on the core on which the first reference winding 1101 and the second reference winding 1102 are wound and/or passed. However, the present disclosure is not limited thereto, and the sensing winding 1100 may have a structure passing through the core.

The sensing winding 1100 is electrically insulated from the primary winding, a noise current generated from a second device 3 is sensed, and a current converted from the noise current at a certain rate may be induced.

The primary winding and secondary winding may be wound in consideration of directions of generation of magnetic flux and/or magnetic flux density.

For example, as the noise first current is input to the first reference winding 1101, a first magnetic flux density may be induced in the core. Similarly, as the noise first current is input to the second reference winding 1102, a second magnetic flux density may be induced in the core.

A first induced current may be induced in the secondary side sensing winding 1100 by the induced first and second magnetic flux densities.

At this time, the sensing transformer is configured so that the first magnetic flux density and the second magnetic flux density induced by the first current may overlap (or reinforce each other), and may generate the first induced current corresponding to the first current in the secondary side insulated from the first through line 21 and the second through line 22, that is, the sensing winding 1100.

Meanwhile, a number of the first reference winding 1101, the second reference winding 1102 and the sensing winding 1100 wound around the core may be appropriately determined according to requirements of the system in which the active EMI filter is used.

For example, a turns ratio of the primary winding that is the first reference winding 1101 and the second reference winding 1102 and the secondary winding that is the sensing winding 1100 may be 1:Nsen. Also, if a self-inductance of the primary winding of the sensing transformer is Lsen, the secondary winding may have a self-inductance of Nsen2·Lsen. The primary winding and the secondary winding of the sensing transformer 120 may be coupled by a coupling coefficient of ksen.

Meanwhile, the aforementioned sensing transformer 110 may be configured such that a magnetic flux density induced by the second current, which is a normal current flowing through each of the first through line 21 and the second through line 22, satisfies a predetermined magnetic flux density condition.

That is, a third magnetic flux density and a fourth magnetic flux density may be induced in the core by the second current flowing through the first reference winding 1101 and the second reference winding 1102, respectively. At this time, the third magnetic flux density and the fourth magnetic flux density may be a condition that cancels each other.

In other words, the sensing transformer 110 may make a second induced current which is induced in the secondary sensing winding 1100 by the second current which is the normal current flowing through each of the first through line 21 and the second through line 22 less than a predetermined threshold, and accordingly, the sensing transformer is configured so that the magnetic flux densities induced by the second current may cancel each other, and may cause only the first current described above to be sensed.

The sensing transformer 110 may be configured such that the size of the first and second magnetic flux densities induced by the first current, which is the noise current of the first frequency band (e.g., a band having a range of 150 KHz to 30 MHz), is greater than the size of the third and fourth magnetic flux densities induced by the second current, which is the normal current of the second frequency band (e.g., a band having a range of 50 Hz to 60 Hz).

In this disclosure, that component A is configured to do B may mean that a design parameter of component A is set to be appropriate for doing B. For example, that the sensing transformer is configured so that a magnitude of magnetic flux induced by current in a specific frequency band is large may mean that the parameters such as the size of the sensing transformer, the diameter of the core, the number of turns, the magnitude of the inductance, and the magnitude of the mutual inductance are appropriately set to increase the magnitude of magnetic flux induced by the current in a specific frequency band.

The sensing winding 1100, which is the secondary side of the sensing transformer 110, may be placed on a path that connects an input terminal of the active circuit unit 12 and a reference potential of the active circuit unit 12 as illustrated in FIG. 2 in order to supply the first induced current to the active circuit unit 12.

According to an embodiment, the active circuit unit 12 may be a means for amplifying the first induced current generated by the sensing transformer to generate an amplified current.

According to an embodiment, the sensing winding 1100 may be differentially connected to the input terminal of the active circuit unit 12.

In this disclosure, amplification by the active circuit unit 12 may mean adjusting a size and/or phase of a amplification target. For example, the active circuit unit 12 may generate the amplified current by changing the phase of the first induced current by 180 degrees and increasing the size by k times (k>=1).

The active circuit unit 12 may be designed to generate the amplified current in consideration of a transformation ratio of the sensing transformer 110 and a transformation ratio of a compensation transformer 131 to be described later. For example, if the sensing transformer 110 converts the first current that is the noise current into the first induced current with a size of 1/F1, and if the compensation transformer 131 converts the amplified current into the compensation current with a size of 1/F2, the active circuit unit 12 may generate an amplified current having a size of F1×F2 times size of the first induced current.

At this time, the active circuit unit 12 may generate the amplified current so that the phase of the amplified current is opposite to the phase of the first induced current.

The active circuit unit 12 may be implemented by various means, and according to an embodiment, the active circuit unit 12 may include an OP AMP 121. According to another embodiment, the active circuit unit 12 may include a plurality of passive devices such as resistors and capacitors in addition to the OP AMP. According to another embodiment, the active circuit unit 12 may include a bipolar junction transistor (BJT) and/or a plurality of passive devices such as resistors and capacitors. However, it is not necessarily limited thereto, and the means for amplification described in the present disclosure may be used without limitation as the active circuit unit 12 of the present disclosure.

The active circuit unit 12 may receive power from a separate power supply device (not illustrated) and amplify the first induced current to generate the amplified current. In this case, the power supply device may be a device that receives power from a power source regardless of the solar inverting system 10 and generates input power of the active circuit unit 12. In addition, the power supply device may be a device that receives power from the solar inverting system 10 and generates the input power of the active circuit unit 12.

The compensation unit 13 may generate a compensation signal based on the amplified output signal.

According to an embodiment, the compensation unit 13 may include a compensation transformer 131. In this case, the compensation transformer 131 may be a means for generating the compensation current on the first through line 21 and the second through line 22 sides or a secondary side 1312 in a state insulated and/or isolated from the first through line 21 and the second through line 22 based on the amplified current.

More specifically, the compensation transformer 131 may generate the compensation current on the secondary side 1312 based on the third magnetic flux density induced by the amplified current generated by the active circuit unit 12 in a primary side 1311 differentially connected to an output terminal of the active circuit unit 12. At this time, the secondary side 1312 may be grounded to the transmission unit 14 to be described later and a reference potential of the active EMI filter (first reference potential).

The secondary side 1312 of the compensation transformer 131 is electrically connected to the first through line 21 and the second through line 22 which are power lines with the transmission unit 14 interposed therebetween. Accordingly, the active circuit unit 12 may be insulated from the power line, and thus the active circuit unit 12 may be protected.

Meanwhile, according to another exemplary embodiment, the primary side 1311 of the compensation transformer 131, the active circuit unit 12 and the sensing winding 1100 may be grounded to a reference potential distinguishable from those of the remaining components of the active EMI filter (second reference potential). That is, the aforementioned reference potential of the active circuit unit 12 (second reference potential) and the reference potential of the active EMI filter (first reference potential) may be different potentials. However, the present disclosure is not necessarily limited thereto, and the first reference potential and the second reference potential may be the same potential.

As described above, according to an embodiment of the present disclosure, by using a reference potential different from the remaining components for the component generating the compensation current and using a separate power source, the component generating the compensation current may operate in an insulated state, thereby improving the reliability of the active EMI filter.

As described above, the compensation transformer 131 may convert the current that is amplified by the active circuit unit 12 and flow through the primary side 1311 of the compensation transformer 131 at a certain rate to induce it in the secondary side 1312 of the compensation transformer 131.

For example, in the compensation transformer 131, a turns ratio of the primary side 1311 and the secondary side 1312 may be 1:Ninj. Also, if a self-inductance of the primary side 1311 of the compensation transformer 131 is Linj, the secondary side 1312 of the compensation transformer 131 may have a self-inductance of $Ninj^2 \cdot Linj$. The primary side and the secondary side of the compensation transformer 131 may be combined with a coupling coefficient of kinj. The current converted through the compensation transformer 131 may be injected as a compensation current Icomp into the first through line 21 and the second through line 22, which are the power lines, through a compensation capacitor unit 141.

The transmission unit 14 may be a means for providing a path through which the current generated by the compensation transformer 131 flows to each of the first through line 21 and the second through line 22, according to an embodiment, the transmission unit 14 may include the compensation capacitor unit 141.

The compensation capacitor unit 141 may include at least two compensation capacitors connecting the reference potential of the active EMI filter (first reference potential) to each of the first through line 21 and the second through line 22. Each of the compensation capacitors may include a Y-capacitor (Y-cap). One end of each compensation capacitor shares a node connected to the secondary side 1312 of the compensation transformer 131, and the other end may have a node connected to each of the first through line 21 and the second through line 22.

The compensation capacitor unit 141 may be configured such that the current flowing between the first through line 21 and the second through line 22 through the at least two compensation capacitors satisfies a predetermined first current condition. In this case, the predetermined first current condition may be a condition in which a size of current is less than a predetermined first threshold.

In addition, the compensation capacitor unit 141 may be configured such that the current flowing between each of the first through line 21 and the second through line 22 and the reference potential of the active EMI filter (first reference potential) through the at least two compensation capacitors satisfies a predetermined second condition. In this case, the predetermined second condition may be a condition in which a size of current is less than a predetermined second threshold.

As illustrated in FIG. 4, in order to maintain stable performance of the active EMI filter having a CSCC structure, an impedance of an output side (i.e., power supply side) of the active EMI filter may be sufficiently smaller than an impedance Zn of a noise source side.

However, the impedance Zn of the noise source side and the impedance Zline of the output side may be arbitrarily changed according to surrounding conditions of a power system and the filter. For example, in the case of home appliances, an outlet or a wall may be located on the output side of the active EMI filter 100, and their impedance Zline may have a random value. Therefore, a decoupling Y-capacitor 15 may be connected in parallel to the active EMI filter to eliminate uncertainty due to the surrounding conditions and to operate independently in any situation.

An impedance ZY of the decoupling Y-capacitor 15 may be designed to have a sufficiently small value in a frequency band that is a target of noise reduction. For example, the impedance ZY of the decoupling Y-capacitor 15 may satisfy Equation 1.

$$Z_{line} \| Z_Y \approx Z_Y \quad \text{[Equation 1]}$$

Referring to Equation 1, the impedance $Z_{line} \| Z_Y \approx Z_Y$ seen from the active EMI filter to the power supply side may have an almost constant value due to the decoupling Y-capacitor 15. For example, the impedance ZY of the decoupling Y-capacitor 15 may be designed to have a value smaller than a specified value. Since the impedance ZY of the decoupling Y-capacitor 15 has a sufficiently small value in the frequency band that is the target of noise reduction, the active EMI filter 100 may operate normally regardless of the output side impedance Zline.

Therefore, the active EMI filter may be used as a stand-alone module in any system. However, this disclosure is not limited thereto. For example, an active EMI filter module may be provided by connecting the decoupling Y-capacitor 15 to the active EMI filter in parallel.

The compensation current flowing to each of the first through line 21 and the second through line 22 along the compensation capacitor unit 141 cancels the first current on the first through line 21 and the second through line 22, so that the transfer of the first current to the second device 2 described above may be prevented. In this case, the first current and the compensation current may be currents having the same size and opposite phases.

Accordingly, in order to suppress the noise current emitted to the solar inverter 200, the active EMI filter according to an embodiment of the present disclosure actively compensates the first current, which is the noise current input to the common mode to each of the first through line 21 and the second through line 22, which are at least two large current paths connected to the solar inverter 200. In this way, it is possible to prevent malfunction or damage of other devices connected to the grid 400 and/or the solar inverter 200.

The active EMI filter having the above structure may be implemented on a substrate, and may be provided such that a first element group including the noise sensing unit 11 provided to detect the electromagnetic wave noise and a second element group including the compensation unit 13 provided to generate the compensation signal for the electromagnetic wave noise are respectively mounted on different substrates.

Figure 5:
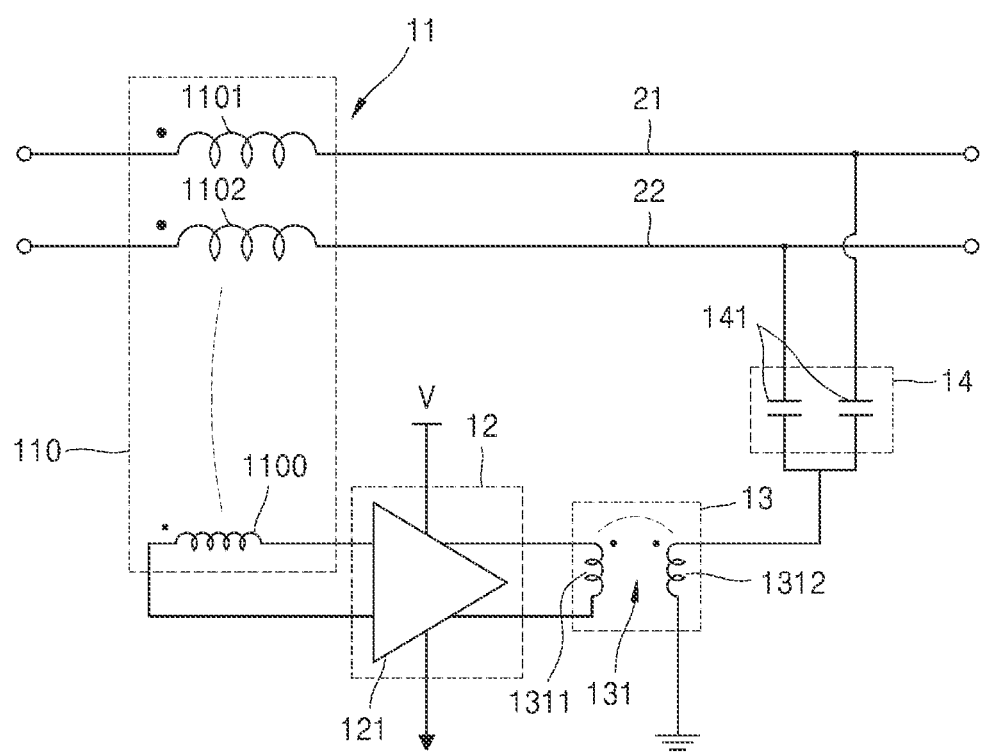
FIG. 5 illustrates a more specific example of an active EMI filter according to another embodiment.

FIG. 5 illustrates a more specific example of an active EMI filter according to another embodiment.

Unlike the embodiment illustrated in FIG. 4, the embodiment illustrated in FIG. 5 includes a feedback type CSCC active EMI filter detecting the noise current flowing out to the solar inverter 200 side and compensating with a current at the grid 400 side. A noise sensing unit 11, an active circuit unit 12, a compensation unit 13 and a transmission unit 14 illustrated in FIG. 5 may each perform the same function as the elements illustrated in FIG. 4.

Figure 6:
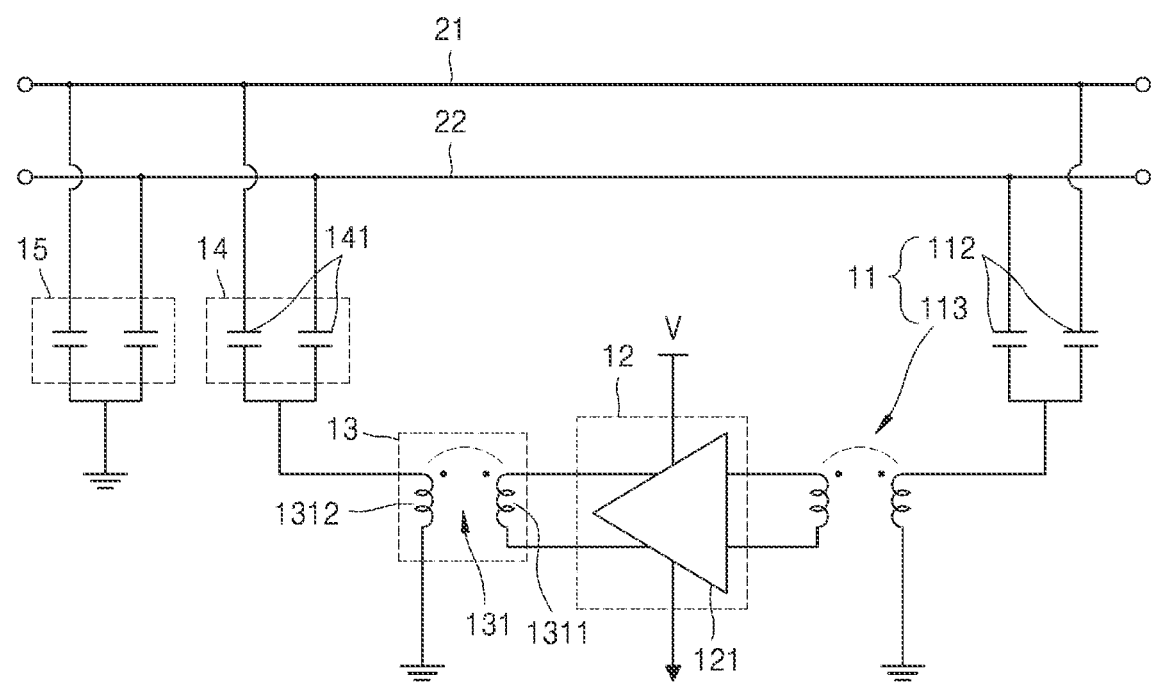
FIG. 6 illustrates a more specific example of an active EMI filter according to another embodiment.

FIG. 6 illustrates a more specific example of an active EMI filter according to another embodiment.

Referring to FIG. 6, in an active EMI filter according to another embodiment, a noise sensing unit 11 may include a sensing capacitor unit 112. The active EMI filter according to the embodiment illustrated in FIG. 6 indicates a voltage-sensing current-compensation (VSCC) active EMI filter that senses a noise voltage by using the sensing capacitor unit 112 and compensates with a current by using a compensation capacitor unit 141 of a transmission unit 14. In the VSCC structure such as the active EMI filter according to this embodiment, feedforward and feedback may not be distinguished in principle of operation. That is, in the active EMI filter illustrated in FIG. 6, there may be no distinction between input/output units. In addition, the active EMI filter according to the embodiment may also have an isolated structure by using a compensation transformer 131 and a sensing transformer 113.

The sensing capacitor unit 112 may sense the noise voltage input to the first through line 21 and the second through line 22, which are the power lines. The sensing capacitor unit 112 may include two sensing capacitors, and each of the sensing capacitors may include a Y-cap. One end of each of the two sensing capacitors may be electrically connected to the first through line 21 and the second through line 22, and the other end may share a node connected to a primary side of the sensing transformer 113. The primary side of the sensing transformer 113 may be electrically connected to the first through line 21 and the second through line 22, which are the power lines, through the sensing capacitor unit 112.

The sensing transformer 113 may include the primary side connected to the power lines side and a secondary side connected to the active circuit unit 12 in order to sense noise flowing through the power lines. The secondary side of the sensing transformer 113 may be differentially connected to an input terminal of the active circuit unit 12.

The sensing transformer 113, the active circuit unit 12, the compensation transformer 131 and the compensation capacitor unit 141 included in the active EMI filter according to the embodiment shown in FIG. 6 may perform operations corresponding to the sensing transformer, the active circuit unit 121, the compensation transformer 131, the compensation capacitor unit 141 and the decoupling Y-capacitor 15 of the above-described embodiments, respectively.

Although not illustrated in the drawings, in the above-described embodiments, the active circuit unit 12 may further include a high-pass filter (not illustrated) between it and the compensation transformer 131 to block the active circuit unit 12 from operating at low frequencies below the frequency band that is the target of noise reduction.

Figure 7A:
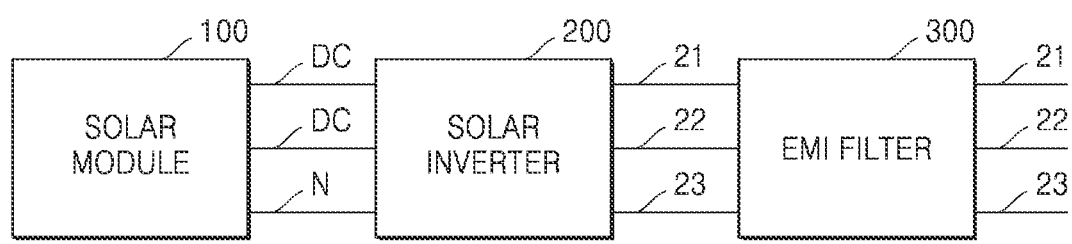
FIGS. 7A and 7B are diagrams for explaining an inverting system for solar generators having three-phases and three-wires according to an embodiment of the present disclosure.
Figure 7B:
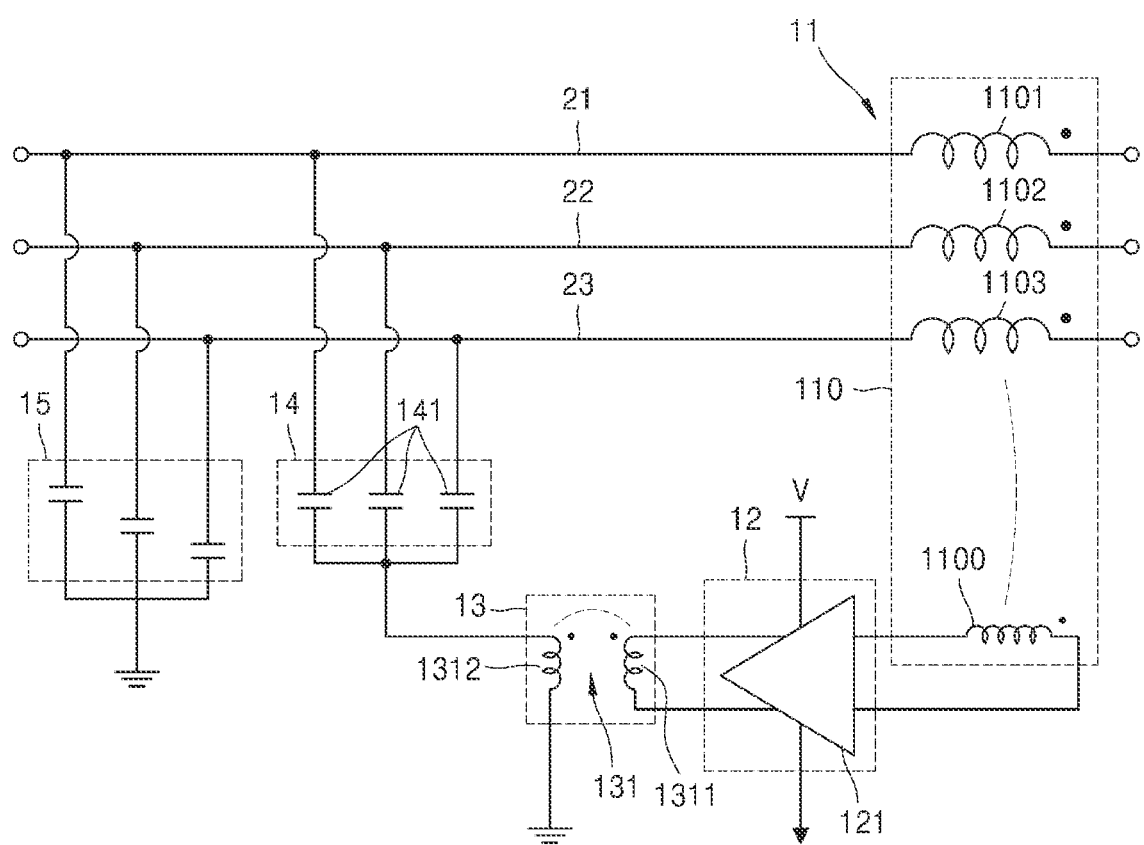

FIGS. 7A and 7B are diagrams for explaining an inverting system for solar generators having three-phases and three-wires according to an embodiment of the present disclosure.

Referring to FIG. 7A, a solar module 100 may input a DC voltage to a solar inverter 200 through two DC lines and one N-phase line. The solar inverter 200 may transmit a converted AC voltage to an EMI filter 300 and a grid 400 through a first through line 21, a second through line 22 and a third through line 23. In this case, the first through line 21 may be an R-phase, the second through line 22 may be an S-phase, and the third through line 23 may be an N-phase power line.

The embodiment illustrated in FIGS. 7A and 7B is shown as a three-phases and three-wires structure based on the embodiment illustrated in FIG. 1, but the present disclosure is not necessarily limited thereto, and may be applied to the illustrated embodiment in FIGS. 4 to 6.

Figure 8A:
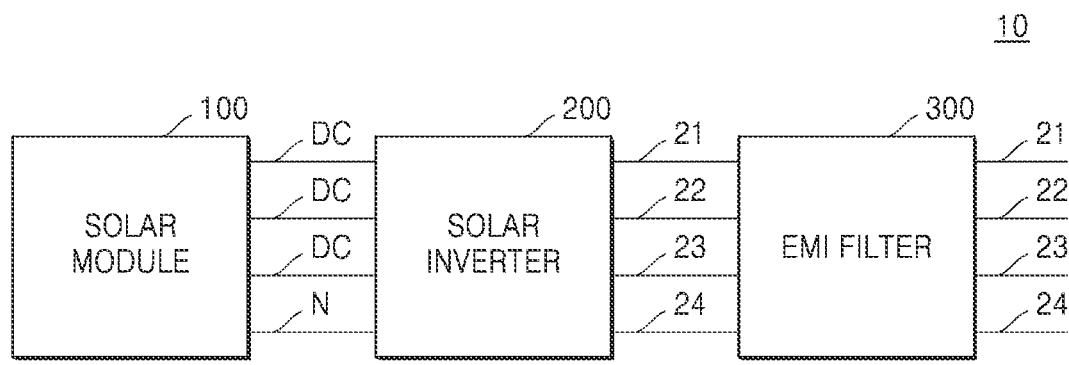
FIGS. 8A and 8B are diagrams for explaining an inverting system for solar generators having three-phases and four-wires according to an embodiment of the present disclosure.
Figure 8B:
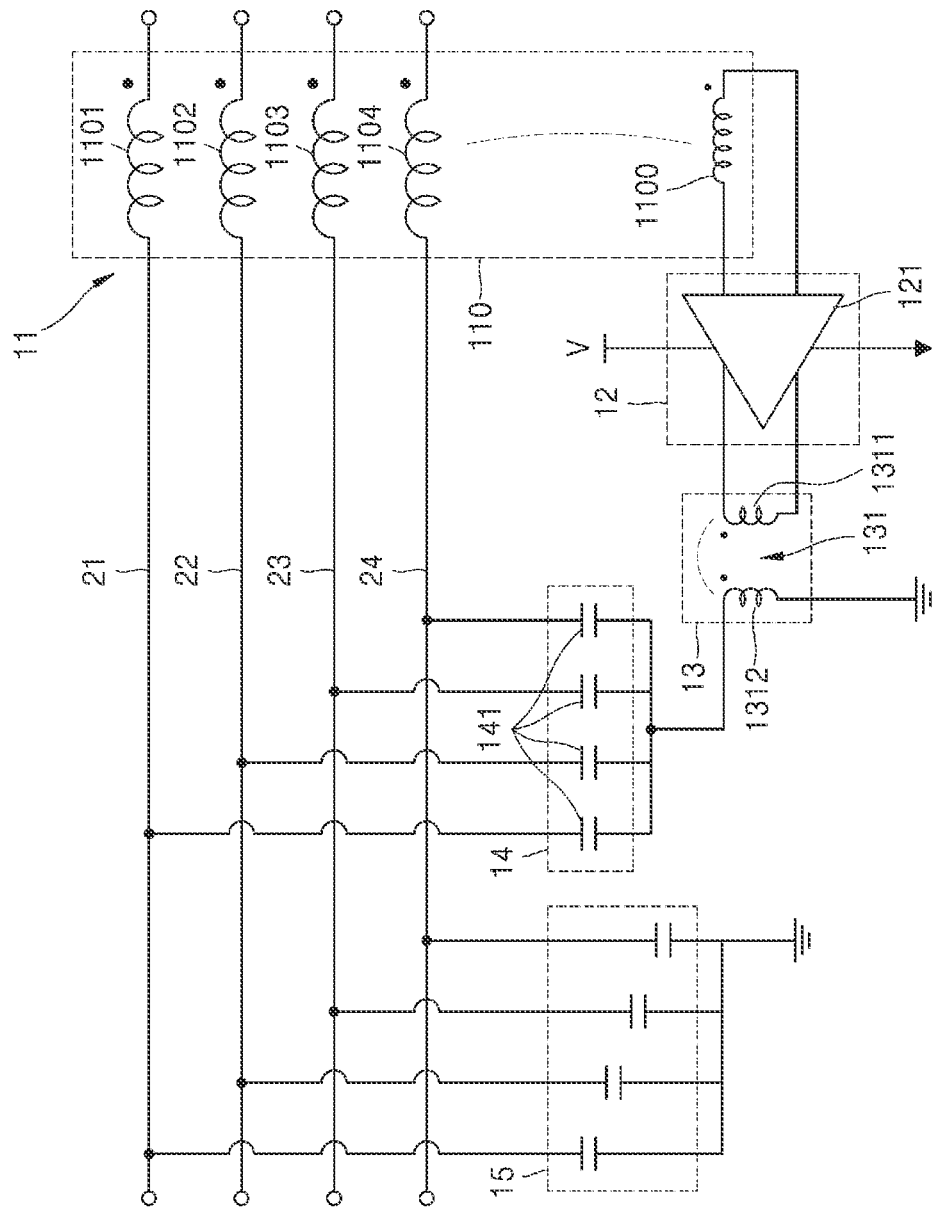

FIGS. 8A and 8B are diagrams for explaining an inverting system for solar generators having three-phases and four-wires according to an embodiment of the present disclosure.

Unlike the embodiment illustrated in FIG. 1 and the three-phases and three-wires embodiment illustrated in FIGS. 7A and 7B, the embodiment illustrated in FIGS. 8A and 8B is an inverting system 10 for solar generators having a three-phases and four-wires structure. In the case of the solar generator, since the current generated by the solar module 100 is large, DC input may be delivered through three DC lines and a thick N-phase line.

Referring to FIG. 8A, the solar module 100 may input a DC voltage to a solar inverter 200 through the three DC lines and the one N-phase line. The solar inverter 200 may transmit a converted AC voltage to an EMI filter 300 and a grid 400 through a first through line 21, a second through line 22 and a third through line 23. In this case, the first through line 21 may be an R-phase, the second through line 22 may be an S-phase, the third through line 23 may be a T-phase, and a fourth through line 24 may be an N-phase power line. As such, in the present disclosure, the quantity of two or more through lines may be variously set according to the configuration of the power generation system used.

The noise sensing unit 11 may include a sensing transformer 110 capable of sensing noise, wherein the sensing transformer includes a first reference winding 1101 to a fourth reference winding 1104 connected to a first through line 21 to a fourth through line 24, respectively, and a sensing winding 1100 formed on a core with the first reference winding 1101 to the fourth reference winding 1104.

The first reference winding 1101 to the fourth reference winding 1104 may be a primary winding connected to a power line, and the sensing winding 1100 may be a secondary winding.

Each of the first reference winding 1101 to the fourth reference winding 1104 may be in a form of a winding wound around the core, but is not necessarily limited thereto, and may include, and at least one of the first reference winding 1101, the second reference winding 1102, the third reference winding 1103 and the fourth reference winding 1104 may pass through the core.

The sensing winding 1100 may have a structure wound at least once on the core on which the first reference winding 1101 to the fourth reference winding 1104 are wound and/or passed or a structure passing through the core once.

The sensing winding 1100 is insulated from the power line in the same way as in the above-described embodiments, and may sense a noise current generated from a second device 3. The primary winding and the secondary winding may be wound in consideration of directions of generation of magnetic flux and/or magnetic flux density.

The sensing winding 1100 supplies an induced current to the active circuit unit 12, and the active circuit unit 12 amplifies it to generate an amplified current. The active circuit unit 12 may be designed to generate the amplified current in consideration of a transformation ratio of the sensing transformer and a transformation ratio of a compensation transformer 131 to be described later. The active circuit unit 12 may be implemented by various means, and according to an embodiment, the active circuit unit 12 may include an OP AMP 121. According to another embodiment, the active circuit unit 12 may include a plurality of passive devices such as resistors and capacitors in addition to the OP AMP. According to another embodiment, the active circuit unit 12 may include a bipolar junction transistor (BJT) and/or a plurality of passive devices such as resistors and capacitors. However, it is not necessarily limited thereto, and the means for amplification described in the present disclosure may be used without limitation as the active circuit unit 12 of the present disclosure.

The amplified current flows to the first through line 21, the second through line 22, the third through line 23 and/or the fourth through line 24 through a compensation unit 13 and a transmission unit 14 to compensate for noise.

The compensation unit 13 may include a compensation transformer 131, and the transmission unit 14 may include a compensation capacitor unit 141, and the specific configuration and function may be the same as those of the above-described embodiments. One end of each of the capacitors of the compensation capacitor unit 141 is connected to the compensation transformer 131, and the other end is connected to the first through line 21 to the fourth through line 24, respectively.

The embodiment illustrated in FIG. 8B is shown as a three-phases and four-wires structure based on the embodiment illustrated in FIG. 1, but the present disclosure is not necessarily limited thereto, and the embodiment illustrated in FIG. 8B is may be applied to the embodiments illustrated in FIGS. 4 to 6.

As illustrated in FIGS. 4 to 8B, when the active EMI filter is applied to the position of the CM choke stage of the conventional solar generator system, the area, volume and weight are greatly reduced. For example, it may be possible to save about 75% in area and 84% in volume.

Meanwhile, in FIGS. 4 to 8B according to an embodiment of the present disclosure, a DC EMI filter 210 may be implemented as the active EMI filter. For example, in the case of a 150 khz~10 Mhz band target, since a main cause of the cable noise radiation is the common mode (CM) noise, an active EMI filter may be applied to the DC EMI filter 210.

Figure 9:
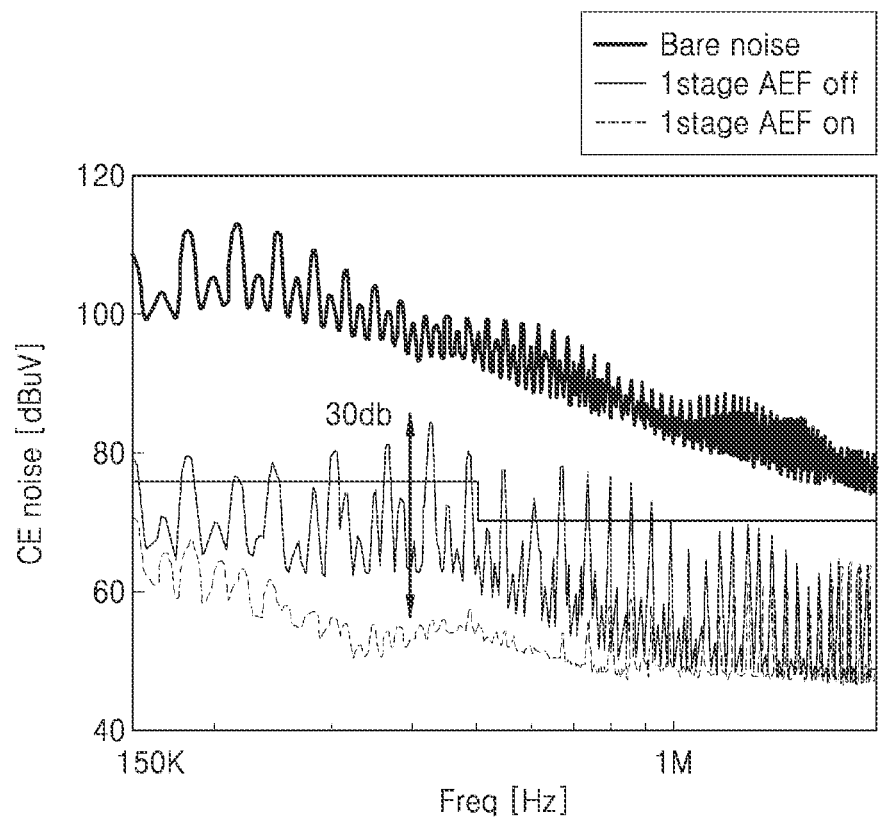
FIG. 9 illustrates a common mode noise removal effect by an inverting system for solar generators according to an embodiment of the present disclosure.

FIG. 9 illustrates a common mode noise removal effect by an inverting system for solar generators according to an embodiment of the present disclosure.

Specifically, FIG. 9 illustrates a noise reduction effect when an active EMI filter (AEF) is turned on/off after the active EMI filter is applied to an inverting system for 34 kW solar generators.

A bare noise generated by the inverting system 10 for solar generators represents over 70 dBuV over the entire frequency range.

In the case of a filter except for the filter to which the active EMI filter such as the DC EMI filter 210 of the inverting system 10 for solar generators of this disclosure is applied (AEF off), the overall noise is generally less than 70 dBuV in the entire frequency range, but a reduction performance also exceeds a noise limit line.

On the other hand, when the EMI filter 300 to which the active EMI filter is applied according to an embodiment of the present disclosure is turned on, it may be confirmed that the noise is reduced to below the noise limit line. That is, when the active EMI filter is applied to the position of the CM choke stage according to the present disclosure, the area, volume, and weight are greatly reduced, and reduction performance may be maintained or improved.

Figure 10:
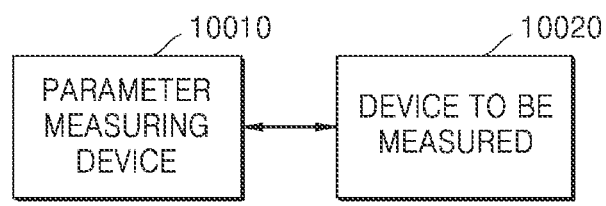
FIG. 10 is a system diagram illustrating a quality inspection system according to an embodiment of the present disclosure.

FIG. 10 is a system diagram illustrating a quality inspection system according to an embodiment of the present disclosure.

Referring to FIG. 10, a quality inspection system of the present disclosure may include a quality inspection apparatus or a parameter measuring device 10010 (hereinafter referred to as a parameter measuring device) and a device to be measured 10020.

At this time, the parameter measuring device 10010 is a configuration for acquiring a test parameter, that is, a transfer function, a reflection characteristic and a phase characteristic (hereinafter, "S parameter"). The S parameter is a well-known technique in the art, and is determined by observing a frequency response (voltage and phase) of a device under test according to a response of a test signal from a network analyzer.

In particular, the parameter measuring device 10010 of the present disclosure may automatically measure the S parameter with only one connection to a multi-channel device under test (DUT) or the device to be measured 10020.

The device under test (DUT) or the device to be measured 10020 may be a device to be measured for the S parameter (or a scattering coefficient). According to an embodiment, the device to be measured 10020 may be the EMI filter (particularly, the active EMI filter). In this case, the active EMI filter may be an active current compensation device for reducing the common mode (CM) noise.

Specifically, the active EMI filter may be a current compensation device that actively compensates a first current input to each of at least two large current paths connected to a first device in the common mode. The active EMI filter may be a current compensation device including a sensing unit sensing a first current on at least two large current paths for transferring a second current supplied by a second device to the first device to generate an output signal corresponding to the first current, an amplifying unit amplifying the output signal to generate an amplified output signal, a compensation unit generating a compensation current based on the amplified output signal, and a compensation capacitor unit providing a path through which the compensation current flows in each of the at least two large current paths. A detailed description thereof will be made with reference to FIG. 11.

Figure 11:
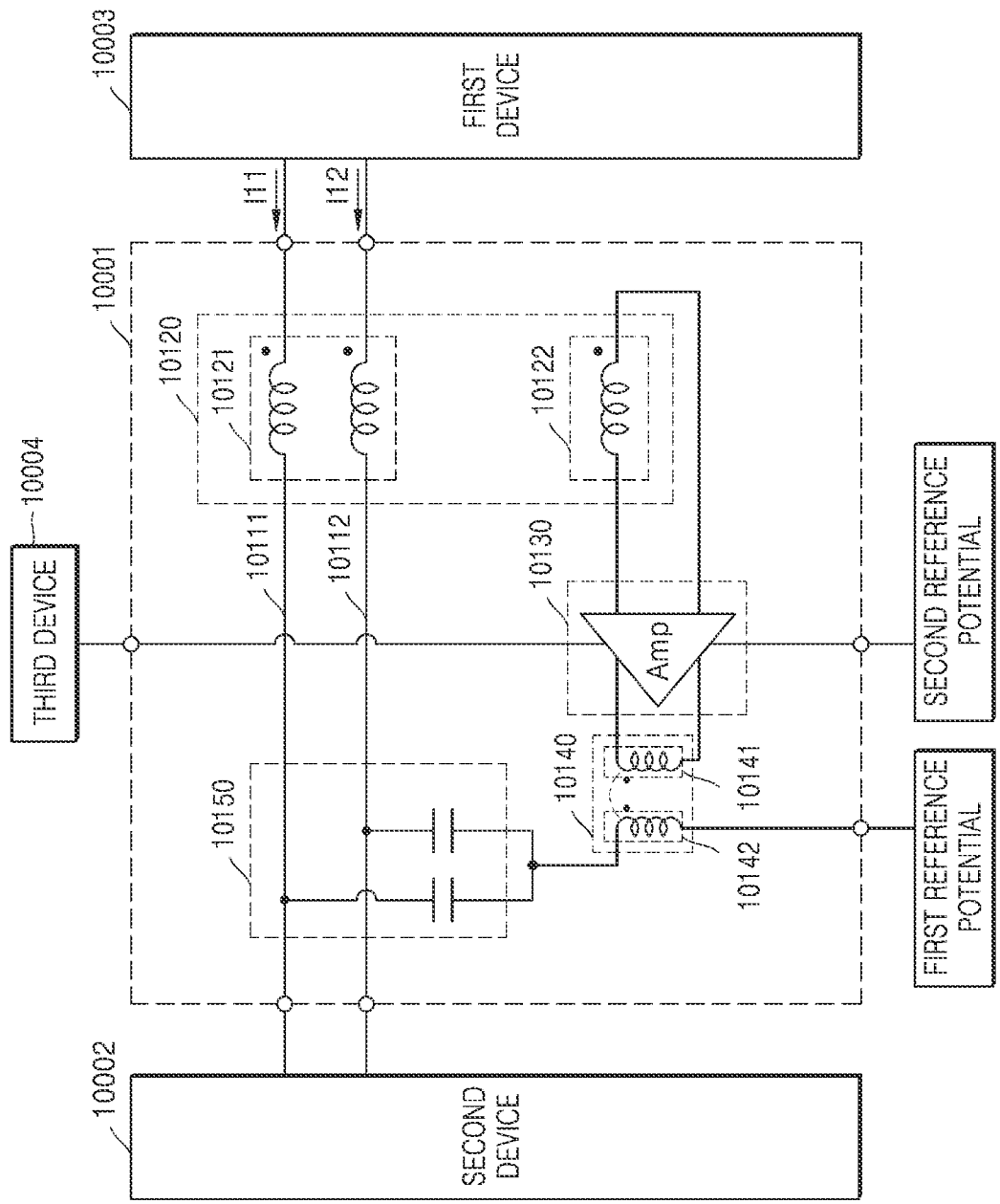
FIG. 11 is a diagram for explaining an active EMI filter as a device to be measured.

FIG. 11 is a diagram for explaining an active EMI filter as a device to be measured.

A second device 10002 may be various types of devices for supplying power to a first device 10003 in the form of current and/or voltage. For example, the second device 10002 may be a device that generates and supplies power, or a device that supplies power generated by another device (e.g., an electric vehicle charging device). Of course, the second device 10002 may be a device that supplies stored energy. However, this is an example, and the spirit of this disclosure is not limited thereto.

In the present specification, the first device 10003 may be various types of devices using power supplied by the aforementioned second device 10002. For example, the first device 10003 may be a load driven using power supplied by the second device 10002. Also, the first device 10003 may be a load (e.g., an electric vehicle) that stores energy using power supplied by the second device 10002 and is driven using the stored energy. However, this is an example, and the spirit of this disclosure is not limited thereto.

As described above, each of two or more large current paths 10111 and 10112 may be a path for transferring the power supplied by the second device 10002, that is, second currents I21 and I22, to the first device 10003, in one embodiment, the second currents I21 and I22 may be an alternating current having a frequency of a second frequency band. In this case, the second frequency band may be, for example, a band having a range of 50 Hz to 60 Hz.

Also, each of the two or more large current paths 10111 and 10112 may be a path through which at least a portion of noise generated in the first device 10003, that is, first currents I11 and I12, is transmitted to the second device 10002. At this time, the first currents I11 and I12 may be input to each of the two or more large current paths 10111 and 10112 in the common mode.

The first currents I11 and I12 may be currents that are unintentionally generated in the first device 10003 due to various causes. For example, the first currents I11 and I12 may be noise currents generated by virtual capacitance between the first device 10003 and a surrounding environment.

The first currents I11 and I12 may be currents having a frequency of a first frequency band. In this case, the first frequency band may have a higher frequency band than the aforementioned second frequency band, and may be, for example, a band having a range of 150 KHz to 30 MHz.

Meanwhile, the two or more large current paths 10111 and 10112 may include two paths, three paths or four paths as illustrated in FIG. 11. The number of large current paths 10111 and 10112 may vary depending on the kind and/or form of power used by the first device 10003 and/or the second device 10002.

Meanwhile, a sensing unit 10120 is electrically connected to the large current paths 10111 and 10112 to sense the first currents I11 and I12 on the two or more large current paths 10111 and 10112, and may generate an output signal corresponding to the first currents I11 and I12. In other words, the sensing unit 10120 may mean a means for sensing the first currents I11 and I12 on the large current paths 10111 and 10112.

According to an embodiment, the sensing unit 10120 may be implemented as a sensing transformer. At this time, the sensing transformer may be a means for sensing the first currents I11 and I12 on the large current paths 10111 and 10112 while insulated from the large current paths 10111 and 10112.

According to an embodiment, the sensing unit 10120 may be differentially connected to an input terminal of an amplifying unit 10130. The amplifying unit 10130 may be electrically connected to the sensing unit 10120 and may generate an amplified output signal by amplifying an output signal output by the sensing unit 10120. In this disclosure, 'amplification' by the amplifying unit 10130 may mean adjusting the size and/or phase of the amplification target.

By amplifying the amplifying unit 10130, the current compensation device 10100 may compensate the first currents I11 and I12 on the large current paths 10111 and 10112 by generating compensation currents IC1 and IC2 having the same size and opposite phase to the first currents I11 and I12.

The amplifying unit 10130 may be implemented by various means. In one embodiment, the amplifying unit 10130 may include an OP AMP. In another embodiment, the amplifying unit 10130 may include a plurality of passive elements such as resistors and capacitors in addition to the OP AMP. In another embodiment, the amplifying unit 10130 may include a bipolar junction transistor (BJT). In another embodiment, the amplifying unit 10130 may include a plurality of passive elements such as resistors and capacitors in addition to the BJT. However, the above implementation method of the amplifying unit 10130 is exemplary and the spirit of the present disclosure is not limited thereto, and the means for amplification described in the present disclosure may be used without limitation as the amplifying unit 10130 of the present disclosure.

The amplifying unit 10130 may receive power from a third device 10004 differentiated from the first device 10003 and/or the second device 10002, and may generate an amplified current by amplifying the output signal output by the sensing unit. In this case, the third device 10004 may be a device that receives power from a power source independent of the first device 10003 and the second device 10002 and generates input power of the amplifying unit 10130. Optionally, the third device 10004 may be a device that receives power from any one of the first device 10003 and the second device 10002 and generates input power of the amplifying unit 10130.

A compensation unit 10140 may be electrically connected to the amplifying unit 10130 and may generate a compensation current based on the output signal amplified by the above-described amplifying unit 10130.

The compensation unit 10140 may be electrically connected to a path connecting an output terminal of the amplifying unit 10130 and a reference potential (second reference potential) of the amplifying unit 10130 to generate the compensation current. The compensation unit 10140 may be electrically connected to a path connecting a compensation capacitor unit 10150 and a reference potential (first reference potential) of the current compensation device 10100. The reference potential (second reference potential) of the amplifying unit 10130 and the reference potential (first reference potential) of the current compensation device 10100 may be different potentials.

The compensation capacitor unit 10150 may provide a path through which the compensation current generated by the compensation unit 10140 flows into each of the two or more large current paths.

According to an embodiment, the compensation capacitor unit 10150 may be implemented as a compensation capacitor unit 10150 that provides a path through which the current generated by the compensation unit 10140 flows to each of the two or more large current paths 10111 and 10112. In this case, the compensation capacitor unit 10150 may include at least two compensation capacitors connecting the reference potential (first reference potential) of the active EMI filter 10001 and the two or more large current paths 10111 and 10112, respectively.

The active EMI filter 10001 configured as above may detect and actively compensate a current under a specific condition on the two or more large current paths 10111 and 10112, and may be applied to high current, high voltage and/or high power systems despite the miniaturization of the active EMI filter 10001.

Meanwhile, the active EMI filter described above is only an example of the device to be measured 10020, and may refer to all types of devices including various analog circuits (or RF) for processing signals using frequencies.

The device to be measured 10020 may be formed of three or more terminals as well as two terminals (ports). In order to measure the S parameter of the device to be measured 10020, the parameter measuring device 10010 having two ports may measure three or more terminals by alternately combining two of them. This will be described in detail later.

Figure 12:
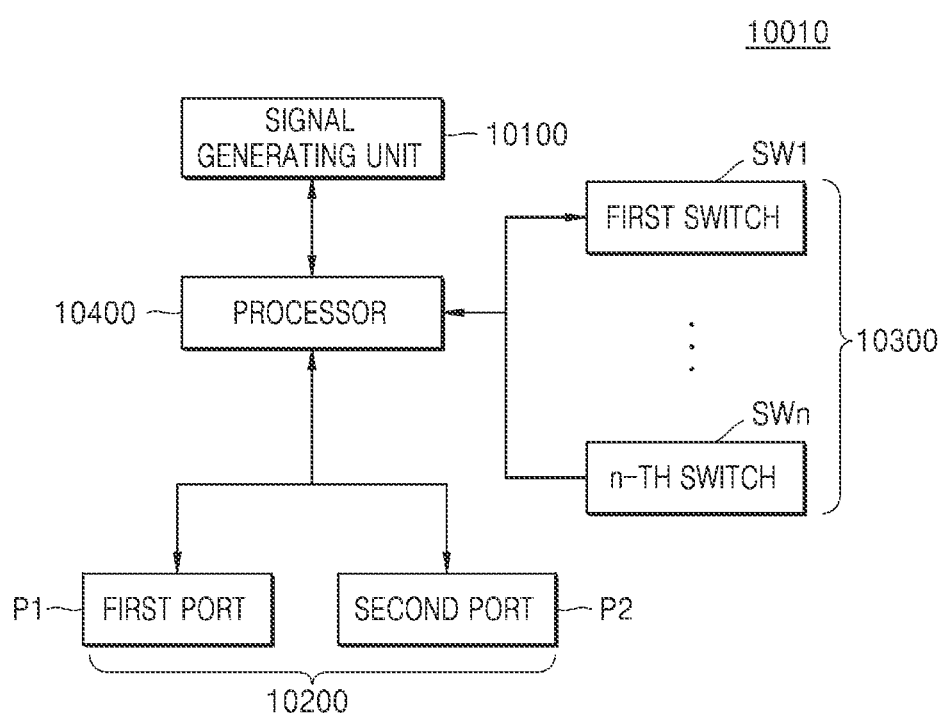
FIG. 12 is a block diagram for explaining components of a parameter measuring device according to an embodiment of the present disclosure.

FIG. 12 is a block diagram for explaining components of a parameter measuring device according to an embodiment of the present disclosure.

Referring to FIG. 12, the parameter measuring device 10010 may include a signal generating unit 10100, a port 10200, a switch unit 10300 and a processor 10400. In this case, the port 10200 may include a first port P1 and a second port P2, and the switch unit 10300 may include a first switch SW1 to an n-th switch SWn.

The signal generating unit 10100 is a component for generating a test signal whose frequency is linearly varied within a predetermined range in response to a control signal from the processor 10400.

The port 10200 may be electrically connected to a terminal (or DUT port) of the device to be measured 10020 through the switch unit 10300. As described above, the port 10200 may include two input-output ports (test ports P1 and P2). The port 10200 may be connected to the device to be measured 10020 through a switch selected according to the control signal of the processor 10400, and may supply the test signal generated by the signal generating unit 10100 to the device to be measured 10020.

The switch unit 10300 may include the first switch SW1 to the n-th switch SWn. Each of the first switch SW1 to the n-th switch SWn may be configured to selectively determine the first port P1 and the second port P2.

For example, each of the first switch SW1 to n-th switch SWn may be a single pole double throw (SPDT) type switch such as EPX36MA8, or a single pole 3 throw (OSP3T) type switch such as TS5A3359DCUT, but this is only an example, and may be implemented through various optional switches.

Each of first switch SW1 to n-th switch SWn may include a switching circuit connecting the circuit to an internal resistor corresponding to an external signal path or each terminal. Each internal resistor in the switch may be set to a normalized characteristic impedance of the measuring device 10010, which is typically 50Ω.

The processor 10400 may be a control unit for overall controlling the parameter measuring device 10010. In particular, the processor 10400 controls the overall operation of the parameter measuring device 10010 using various programs stored in a memory (not illustrated).

Specifically, the processor 10400 may control the switch unit 10300 to select two terminals from among the plurality of terminals of the device to be measured 10020.

The processor 10400 may control the signal generating unit 10100 to generate the test signal to be supplied to the device to be measured 10020 through the selected two switches. The processor 10400 may control the port 10200 to supply the test signal generated by the signal generating unit 10100 to the device to be measured 10020. Specifically, the processor 10400 controls the plurality of switches to alternately connect the two switches to the first port and the second port, respectively, and controls the first port P1 to input the test signal to the device to be measured 10020 through one of the two switches, and may measure the S parameter based on a reflected signal and a response signal acquired through the port.

The processor 10400 may control the input port to transmit a sweep frequency signal (test signal) to the device to be measured 10020 under test, and control the output port to receive a response output signal from the device to be measured 10020 under test. In this case, the input port and the output port may be changed according to a sweep direction among the port 10200.

Specifically, the processor 10400 controls the second port P2 to input the test signal to the device to be measured 10020 through any one of the two switches, and may measure the S parameter based on the reflected signal and response signal acquired through the port 10200.

That is, the processor 10400 may measure the reflection or response signal of the device to be measured 10020 corresponding to the test signal input to the port 10200, and may obtain the S parameter for the device to be measured 10020 based on this. Specifically, a frequency-converted input signal and a reference signal may each be converted into a digital signal by an AD converter (not illustrated), and the digital signal is processed by a digital signal processor (DSP) 65, so that the processor 10400 may determine the S parameter of the device to be measured 10020 under test. The processor 10400 may extract a Z parameter based on the acquired S parameter, and then calculate a circuit parameter.

The processor 10400 may include a CPU, a RAM, a ROM and a system bus. Here, the ROM is a configuration in which a command set for booting a system is stored, and the CPU copies an operating system stored in a memory of the parameter measuring device 10100 according to the commands stored in the ROM and executes O/S to boot the system. When booting is complete, the CPU may perform various operations by copying various applications stored in the memory (not illustrated) to RAM and executing them. Although it has been described above that the processor 10400 includes only one CPU, it may be implemented with a plurality of CPUs (or DSPs, SoCs, etc.).

According to an embodiment of the present disclosure, the processor 10400 may be implemented as a digital signal processor (DSP), a microprocessor, or a time controller (TCON) for processing a digital signal. However, the present disclosure is not limited thereto, it may include one or more of a central processing unit (CPU), a micro controller unit (MCU), a micro processing unit (MPU), a controller, an application processor (AP), or a communication processor (CP), an ARM processor, or may be defined by a corresponding term. In addition, the processor 10400 may be implemented as a system on chip (SoC), large scale integration (LSI), or a field programmable gate array (FPGA) having a built-in processing algorithm.

Figure 13:
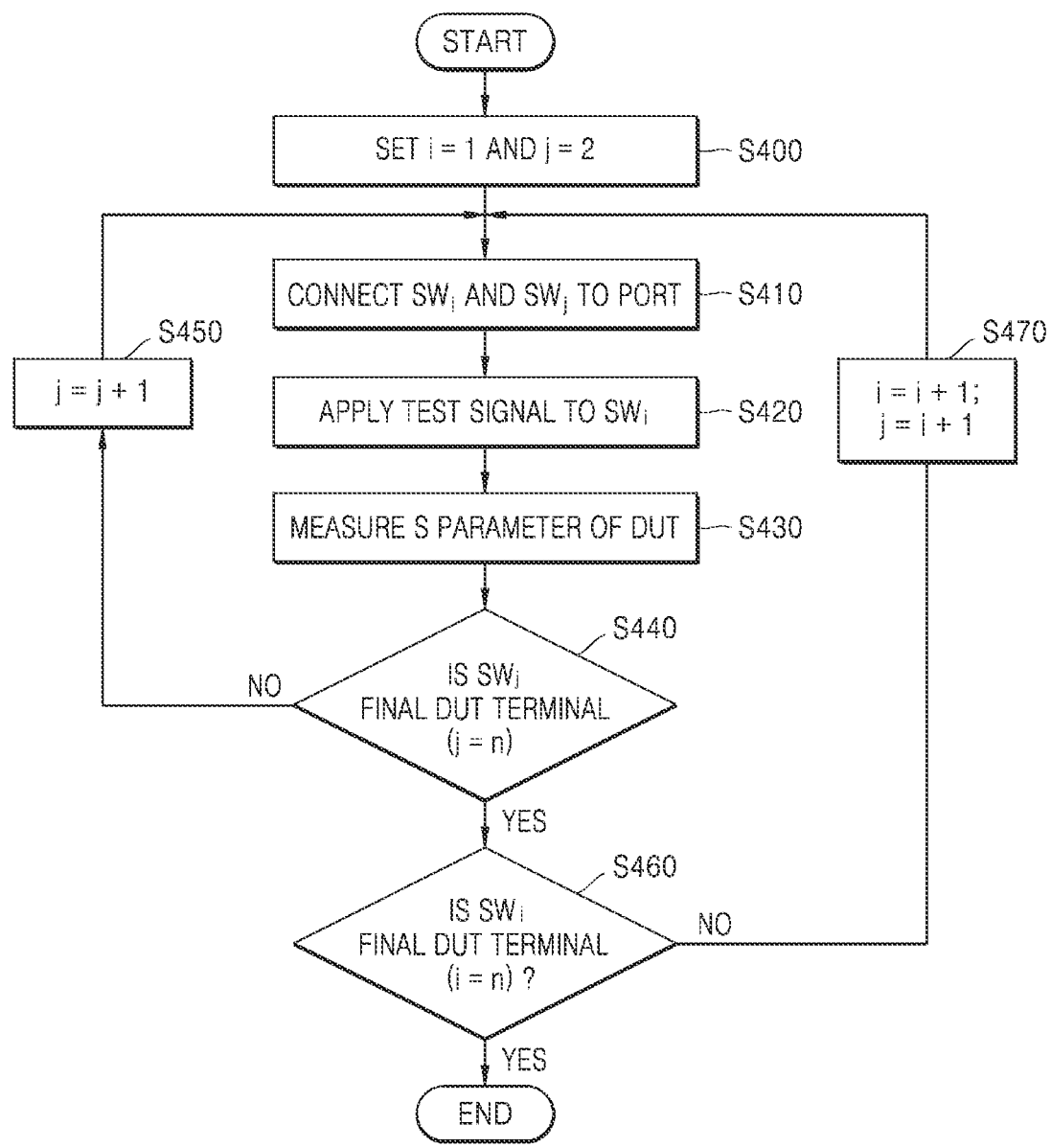
FIG. 13 is a flowchart illustrating a switch selection method for measuring an S parameter according to an embodiment of the present disclosure.

FIG. 13 is a flowchart illustrating a switch selection method for measuring an S parameter according to an embodiment of the present disclosure.

The parameter measuring device 10010 may select two switches for connecting to the port 10200 among the switches 10300. In this case, the number of switches 10300 may be the same as the number corresponding to the number of ports or terminals of the device to be measured 10020. For example, if the number of terminals of device to be measured 10020 is 4, the switch unit 10300 may include switches SW1 to SW4, and if the number of terminals of device to be measured 10020 is n, the switch unit 10300 may include switches SW1 to SWn.

Meanwhile, the parameter measuring device 10010 may select two switches SWi and SWj for connecting to the first port P1 and the second port P2, respectively, among the switches SW1 to SWn. The parameter measuring device 10010 may set switch numbers i and j for connecting to the port 10200 to i=1, j=2, respectively (S400).

The parameter measuring device 10010 may connect the selected SWi and SWj (e.g., SW1 and SW2) to the port 10200 (S410). For example, the parameter measuring device 10010 may connect a first SWitch SWi to a input port P1, and connect a second switch SWj to a output port P2.

The parameter measuring device 10010 may apply the test signal through the input port P1 to which the first SWitch SWi is connected (S420), and may measure the S parameter of the device to be measured 10020 based on the response output signal obtained through the output port P2 to which the second SWitch SWj is connected (S430).

Meanwhile, the parameter measuring device 10010 may check whether the terminal corresponding to the second switch SWj is a final unmeasured terminal among the plurality of terminals of the device to be measured 10020 (j=n) (S440).

When the terminal corresponding to the second switch SWj is not the final terminal (S440-N), the parameter measuring device 10010 may increase a terminal number of the device to be measured 10020 corresponding to the second switch SWj (j=j+1) (S450). Thereafter, the parameter measuring device 10010 may connect the selected SWi and SWj (e.g., SW1 and SW3) to the port 10200 (S410), and repeat measuring the S parameter until the terminal corresponding to the second SWitch SWj becomes the final unmeasured terminal among the plurality of terminals of the device to be measured 10020 (j=n).

Meanwhile, the parameter measuring device 10010 may check whether the terminal corresponding to the first SWitch SWi is the final unmeasured terminal among the plurality of terminals of the device to be measured 10020 (i=n) (S460).

If the terminal corresponding to the first SWitch SWi is not the final terminal (S460-N), the parameter measuring device 10010 may increase the terminal number of the device to be measured 10020 corresponding to the first SWitch SWi (i=i+1), and may change the terminal number of the device to be measured 10020 corresponding to the second SWitch SWj (j=i+1) (S470). Thereafter, the parameter measuring device 10010 may connect the selected SWi and SWj (e.g., SW2 and SW3) to the port 10200 (S410), and may repeat measuring the S parameter until the terminal corresponding to the second SWitch SWj becomes the final unmeasured terminal among the plurality of terminals of the device to be measured 10020 (j=n).

The parameter measuring device 10010 may repeat measuring the S parameter until the terminal corresponding to the first SWitch SWi becomes the final unmeasured terminal among the plurality of terminals of the device to be measured 10020 (i=n).

Figure 14:
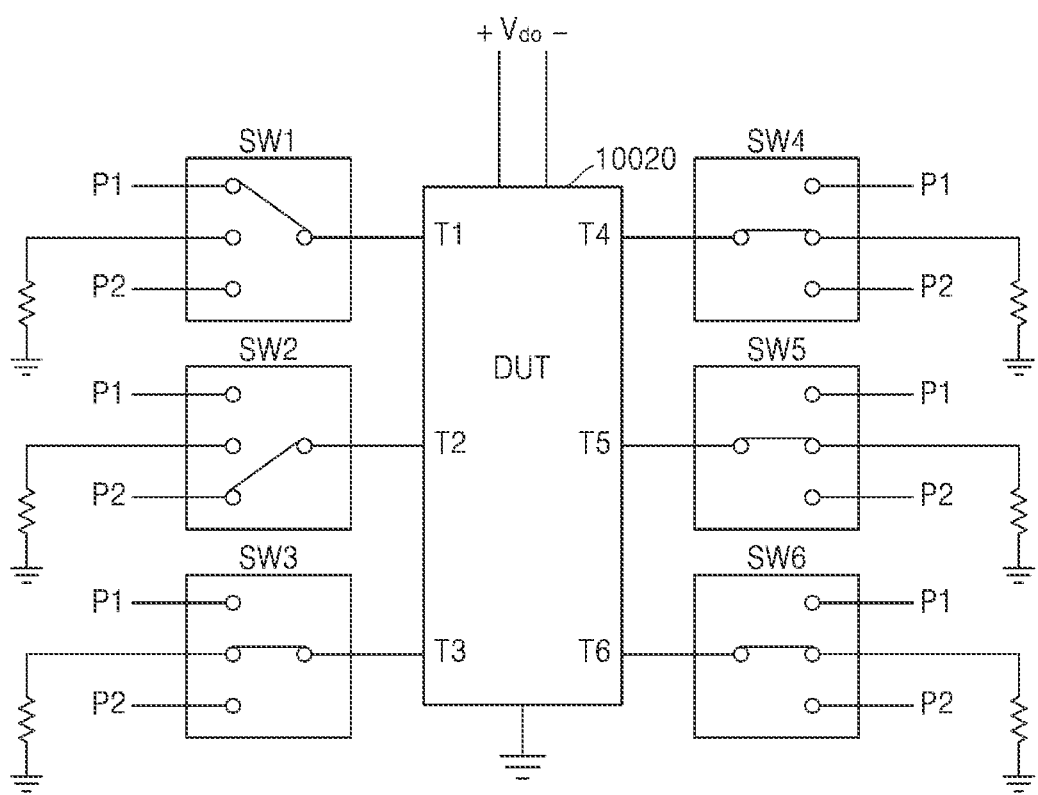
FIGS. 14 to 16 are views sequentially illustrating a switch operation method and a parameter measuring method of a parameter measuring device according to an embodiment of the present disclosure.
Figure 15:
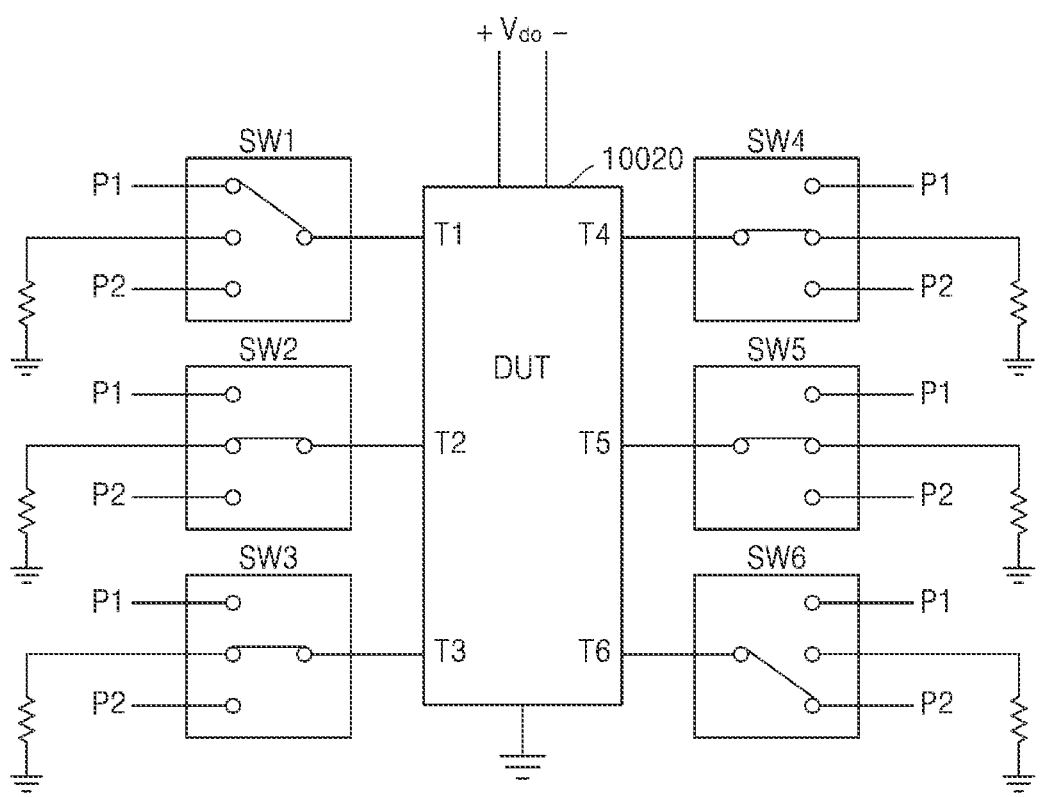
Figure 16:
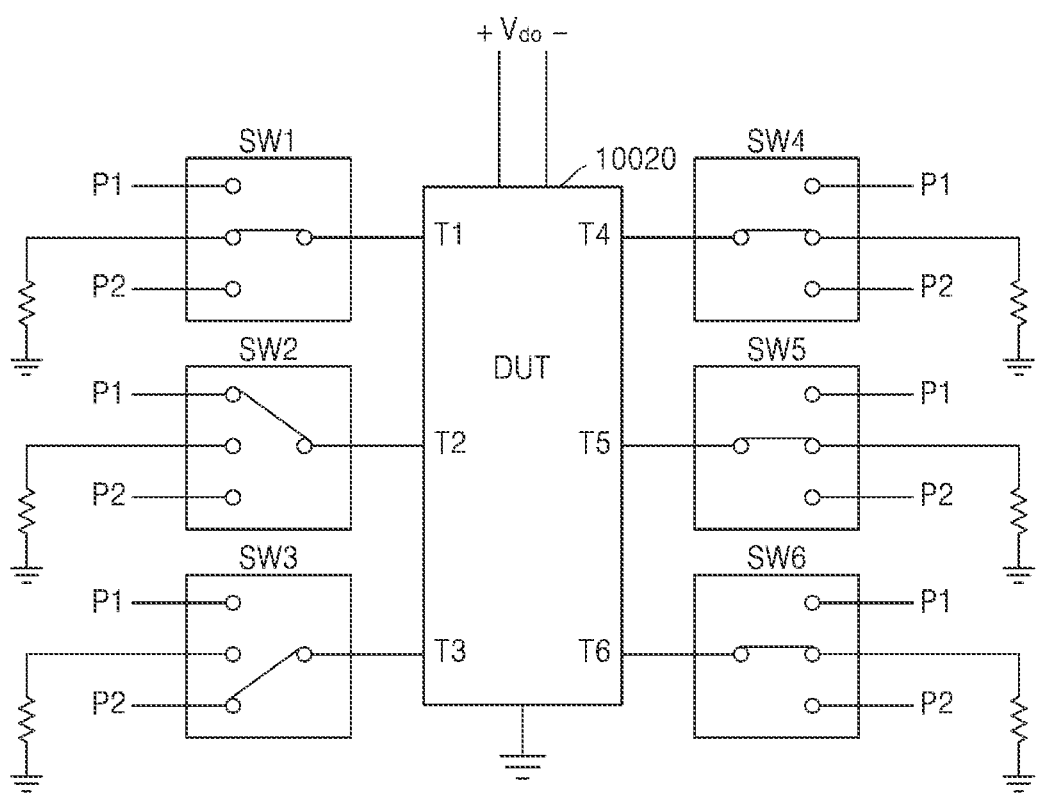

FIGS. 14 to 16 are views sequentially illustrating a switch operation method and a parameter measuring method of a parameter measuring device according to an embodiment of the present disclosure.

FIGS. 14 to 16 illustrate an embodiment in which a device to be measured 10020 includes a total of six DUT ports or terminals T1 to T6. Switches SW1 to SW6 of a switch unit 10300 may correspond to the terminals T1 to T6 of the device to be measured 10020, respectively.

Each of the switches SW1 to SW6 of the switch unit 10300 of FIGS. 14 to 16 is implemented as a single pole 3 throw (SP3T) or single pole triple throw (SPTT) type switch. Specifically, each of the switches SW1 to SW6 may be an SP3T switch selectively connectable to an internal resistor including a first port P1, a second port P2, and a normalized impedance corresponding to each terminal.

The parameter measuring device 10010 may select two switches for connection with port 10200 among the switches SW1 to SW6. FIG. 14 illustrates that the first switch SW1 and the second switch SW2 are selected as the two switches for connecting to the port 10200.

In the embodiment of FIG. 14, SW3 to SW6 other than SW1 and SW2 may be connected to the internal resistor including the normalized impedance. The device to be measured 10020 that received a test signal from the first port P1 connected to the first switch SW1 may measure the S parameters S11 and S21 based on a reflected signal corresponding to the test signal and a response signal output to the second port P2.

The parameter measuring device 10010 may measure the S parameter by changing the second switch from SW2 to SW6 while maintaining the first switch SW1. FIG. 15 is a view illustrating that the parameter measuring device 10010 changes the second switch up to the SW6. Referring to FIG. 15, the remaining switches SW2 to SW5 except for the first switch SW1 and the second switch SW6 are connected to the internal resistor including the normalized impedance.

FIG. 16 illustrates that the parameter measuring device 10010 measures the S parameter by changing the second switch from SW2 to SW6 while maintaining the first switch at SW1, and then changes the first switch from SW1 to SW2.

The parameter measuring device 10010 connects the first switch SW2 and the second switch SW3 to the port 10200 to measure the S parameter, and then may measure the S parameter by changing the second switch to SW4 to SW6 while maintaining the first switch SW2.

According to the present disclosure, the parameter measuring device 10010 may sequentially measure the S parameter for the device to be measured 10020 automatically after connecting the port 10200 to the switch unit 10300.

That is, in the case of the parameter measuring device 10010 according to the present disclosure, when measuring the S parameter for the device to be measured 10020 including the plurality of terminals, the connection between the port of the parameter measuring device 10010 and the DUT port (or DUT terminal) does not have to be changed many times, so that time is saved and cable damage is prevented.

Meanwhile, the above-described methods according to various embodiments of the present disclosure may be implemented in the form of an application that may be installed in an existing electronic device.

In addition, the above-described methods according to various embodiments of the present disclosure may be implemented only by upgrading software or hardware of an existing electronic device.

In addition, various embodiments of the present disclosure described above may be performed through an embedded server provided in an electronic device or an external server of the electronic device.

Meanwhile, according to an embodiment of the present disclosure, the various embodiments described above may be implemented as software including commands stored in a recording medium (computer readable recording medium) may be read by a computer or similar device using a software, a hardware, or a combination thereof. In some cases, the embodiments described herein may be implemented by the processor itself. According to the software implementation, embodiments such as the procedures and functions described in this specification may be implemented as separate software modules. Each of the software modules may perform one or more functions and operations described herein.

Meanwhile, the computer or the similar device is a device capable of calling a stored command from a storage medium and operating according to the called command, and may include the device according to the disclosed embodiments. When the instruction is executed by the processor, the processor may directly or use other components under the control of the processor to perform a function corresponding to the instruction. Instructions may include code generated or executed by a compiler or interpreter.

The device-readable recording medium may be provided in a form of a non-transitory computer readable recording medium. Here, 'non-transitory' means that the storage medium does not include a signal and is tangible, and does not distinguish that data is semi-permanently or temporarily stored in the storage medium. In this case, the non-transitory computer-readable medium does not mean a medium that stores data for a short time such as register, cache and memory, but a medium that stores data semi-permanently and may be read by a device. Specific examples of the non-transitory computer-readable medium may include a CD, DVD, hard disk, Blu-ray disk, USB, memory card, ROM, and the like.

As such, the present disclosure has been described with reference to the embodiment shown in the drawings, which is merely exemplary, and those skilled in the art will understand that various modifications and equivalent other embodiments are possible therefrom. Therefore, the true technical protection scope of the present disclosure should be determined by the technical spirit of the appended claims.

The invention claimed is:

1. An inverting system for solar generators, the inverting system comprising:
a solar inverter converting DC voltage to AC voltage;
an electromagnetic interference (EMI) filter unit comprising an active EMI filter to reduce noise corresponding to the AC voltage;
a power grid; and
at least two or more through lines passing a power current from the power grid to the solar inverter and passing through the EMI filter unit,
wherein the active EMI filter comprises
a sensing unit sensing the noise on the at least two or more through lines and generating an output signal corresponding to the noise,
an active circuit unit amplifying the output signal to generate an amplified signal,
a compensation unit generating a compensation current based on the amplified signal, and
a transmission unit providing a path through which the compensation current flows to each of the at least two or more through lines.

2. The inverting system of claim 1, wherein the EMI filter unit comprises a first AC EMI filter and a second AC EMI filter, wherein at least one of the first AC EMI filter and the second AC EMI filter comprises the active EMI filter.

3. The inverting system of claim 1, wherein
the solar inverter comprises a DC EMI filter, and
the DC EMI filter comprises the active EMI filter.

4. The inverting system of claim 1, further comprising a decoupling Y-capacitor unit to adjust an impedance of an output side of the active EMI filter.

5. The inverting system of claim 4, wherein the decoupling Y-capacitor unit comprises at least one capacitor having a first end and a second end, and wherein the first end of the capacitor is connected to a reference potential, and the second end of the capacitor is connected to one of the at least two or more through lines.

6. The inverting system of claim 1, wherein the sensing unit is placed at the grid side.

7. The inverting system of claim 1, wherein the sensing unit is placed at the solar inverter side.

8. The inverting system of claim 1, wherein:
the sensing unit comprises a sensing transformer, and
the sensing transformer comprises at least two or more reference windings connected to the at least two or more through lines respectively, and a sensing winding formed on a core with the reference windings.

9. The inverting system of claim 8, wherein the sensing unit further comprises a sensing capacitor unit electrically connected between the at least two or more through lines and the sensing transformer to sense a noise voltage input to the at least two or more through lines.

10. The inverting system of claim 1, further comprising a solar module configured to convert solar energy into an electric voltage through a photoelectric effect, and to supply DC voltage generated by solar power generation to the solar inverter.

11. The inverting system of claim 10, wherein the solar module inputs the DC voltage to the solar inverter through two DC lines and one N-phase line, and the solar inverter transmits the converted AC voltage to the EMI filter unit through three through lines of the at least two or more through lines.

12. The inverting system of claim 10, wherein the solar module inputs the DC voltage to the solar inverter through three DC lines and one N-phase line, and the solar inverter transmits the converted AC voltage to the EMI filter unit through four through lines of the at least two or more through lines.

* * * * *